US007396381B2

(12) United States Patent
Graham et al.

(10) Patent No.: US 7,396,381 B2
(45) **Date of Patent: *Jul. 8, 2008**

(54) STORAGE AND DELIVERY SYSTEMS FOR GASES HELD IN LIQUID MEDIUM

(75) Inventors: David Ross Graham, Harleysville, PA (US); Daniel Joseph Tempel, Macungie, PA (US); Bernard Allen Toseland, Allentown, PA (US); Philip Bruce Henderson, Allentown, PA (US); James Joseph Hart, Fogelsville, PA (US); John Bruce Appleby, Shade Gap, PA (US); Jeffrey Richard Brzozowski, Kunkletown, PA (US); Pushpinder Singh Puri, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 722 days.

This patent is subject to a terminal disclaimer.

(21) Appl. No.: 10/887,561

(22) Filed: Jul. 8, 2004

(65) Prior Publication Data

US 2006/0008392 A1 Jan. 12, 2006

(51) Int. Cl.
*F17C 11/00* (2006.01)
*B01D 19/00* (2006.01)

(52) U.S. Cl. .................................. 95/46; 95/241; 222/3

(58) Field of Classification Search ................... 95/149, 95/232-235, 241, 46, 156; 96/108, 155, 96/243; 423/210; 422/129, 168; 206/0.6, 206/0.7; 222/3; 252/181.3, 183.11
See application file for complete search history.

(56) References Cited

U.S. PATENT DOCUMENTS

| | | | | |
|---|---|---|---|---|
| 1,821,549 | A * | 9/1931 | Hornor et al. | 422/188 |
| 4,032,311 | A * | 6/1977 | Bohmrich et al. | 55/385.4 |
| 4,483,461 | A * | 11/1984 | Igarashi | 222/3 |
| 4,744,221 | A | 5/1988 | Knollmueller | |
| 4,761,164 | A * | 8/1988 | Pez et al. | 95/44 |
| 4,788,825 | A | 12/1988 | Calupca et al. | |
| 5,409,526 | A * | 4/1995 | Zheng et al. | 96/132 |
| 5,518,528 | A | 5/1996 | Tom et al. | |
| 5,917,140 | A | 6/1999 | Tom | |

(Continued)

FOREIGN PATENT DOCUMENTS

| | | |
|---|---|---|
| CN | 86203578 | 3/1987 |

(Continued)

*Primary Examiner*—Frank M. Lawrence
(74) *Attorney, Agent, or Firm*—Geoffrey L. Chase; Lina Yang

(57) ABSTRACT

The present invention is directed to improvements in storage and delivery systems that allow for rapid fill and delivery of gases reversibly stored in a nonvolatile liquid medium, improvements in delivery and purity of the delivered gas. The low pressure storage and delivery system for gas which comprises:

a container having an interior portion containing a reactive Lewis basic or Lewis acidic reactive liquid medium that is reversibly reacted with a gas having opposing Lewis acidity or basicity;

a system for transferring energy into or out of the reactive liquid medium; or, a product gas purifier (e.g. a gas/liquid separator); or both.

24 Claims, 5 Drawing Sheets

U.S. PATENT DOCUMENTS

| | | | | |
|---|---|---|---|---|
| 5,980,599 | A * | 11/1999 | Chris et al. | 55/312 |
| 6,012,453 | A | 1/2000 | Tsals et al. | |
| 6,101,816 | A | 8/2000 | Wang et al. | |
| 6,132,492 | A * | 10/2000 | Hultquist et al. | 95/45 |
| 6,500,238 | B1 | 12/2002 | Brandes et al. | |
| 6,557,591 | B2 | 5/2003 | Pearlstein et al. | |
| 6,572,688 | B2 * | 6/2003 | Irven et al. | 96/135 |
| 6,932,945 | B2 * | 8/2005 | Hertzler | 422/171 |
| 7,160,359 | B2 * | 1/2007 | Vincent et al. | 95/90 |
| 7,172,646 | B2 * | 2/2007 | Tempel et al. | 95/241 |
| 7,208,605 | B2 * | 4/2007 | Davis, Jr. | 548/110 |
| 2002/0055242 | A1 | 5/2002 | Uhlenbrock et al. | |

FOREIGN PATENT DOCUMENTS

| | | |
|---|---|---|
| CN | 86207903 | 11/1987 |
| EP | 1 486 458 A2 | 12/2004 |
| FR | 2.011.354 | 2/1970 |
| WO | WO 02/11860 A1 | 2/2002 |

* cited by examiner

STORAGE AND DELIVERY SYSTEMS FOR GASES HELD IN LIQUID MEDIUM

CROSS-REFERENCE TO RELATED APPLICATIONS

This application is related to commonly assigned, U.S. Pat. No. 7,172,646, having a filing date of Apr. 15, 2003 and the title "Reactive Liquid Based Gas Storage And Delivery Systems" and commonly assigned, copending application U.S. patent application Ser. No. 10/867,068, having a filing date of Jun. 14, 2004 and the title, "Liquid Media Containing Lewis Acidic Reactive Compounds For Storage And Delivery Of Lewis Basic Gases", the subject matter of which are hereby incorporated by reference.

BACKGROUND OF THE INVENTION

Many processes in the semiconductor industry require a reliable source of process gases for a wide variety of applications. Often these gases are stored in cylinders or vessels and then delivered to the process under controlled conditions from the cylinder. The semiconductor manufacturing industry, for example, uses a number of hazardous specialty gases such as phosphine, arsine, and boron-trifluoride for doping, etching, and thin-film deposition. These gases pose significant safety and environmental challenges due to their high toxicity and pyrophoricity (spontaneous flammability in air). In addition to the toxicity factor, many of these gases are compressed and liquefied for storage in cylinders under high pressure. Storage of toxic gases under high pressure in metal cylinders is often unacceptable because of the possibility of developing a leak or catastrophic rupture of the cylinder.

Low pressure storage and delivery systems have been developed which provide for adsorption of these gases onto a solid support. Storage and delivery systems of gases sorbed onib solid sorbents are not without their problems. They suffer from poor capacity and delivery limitations, poor thermal conductivity, and so forth.

The following patents and articles are illustrative of low pressure, low flow rate gas storage and delivery systems.

U.S. Pat. No. 4,744,221 discloses the adsorption of $AsH_3$ onto a zeolite. When desired, at least a portion of the $AsH_3$ is released from the delivery system by heating the zeolite to a temperature of not greater than about 175° C. Because a substantial amount of $AsH_3$ in the container is bound to the zeolite, the effects of an unintended release due to rupture or failure are minimized relative to pressurized containers.

U.S. Pat. No. 5,518,528 discloses delivery systems based on physical sorbents for storing and delivering hydride, halide, and organometallic Group V gaseous compounds at sub-atmospheric pressures. Gas is desorbed by dispensing it to a process or apparatus operating at lower pressure.

U.S. Pat. No. 5,917,140 discloses a storage and delivery apparatus for dispensing a sorbable fluid from a solid-phase sorbent with enhanced heat transfer means incorporating radially extending arms each of which abuts and is secured in heat transfer relationship with the wall of the vessel.

WO/0211860 discloses a system for storage and delivery of a sorbate fluid in which the fluid is retained on a sorbent medium and desorption of the fluid from the medium is facilitated by inputting energy to the medium. Methods of energy input include thermal energy, photonic energy, particle bombardment, mechanical energy, and application of chemical potential differential to the sorbate fluid.

U.S. Pat. No. 6,101,816 discloses a fluid storage and dispensing system for a liquid whose vapor is to be dispensed.

Associated with the system is a fluid flow port and fluid dispensing assembly associated with the port. The assembly comprises a fluid pressure regulator and a flow control valve. The arrangement is such that the gas from within the vessel flows through the regulator first prior to flow through the flow control element.

BRIEF SUMMARY OF THE INVENTION

The present invention is directed to improvements in storage and delivery systems that allow for rapid fill and delivery of gases reversibly stored in a nonvolatile liquid medium and improvements in delivery and purity of the delivered gas. The low pressure storage and delivery system for gas which comprises:

- a container having an interior portion containing a Lewis basic or Lewis acidic reactive liquid medium that is reversibly reacted with a gas having opposing Lewis acidity or basicity;
- a system for transferring energy into or out of the reactive liquid medium; or,
- a product gas purifier (e.g. a gas/liquid separator); or both.

Significant advantages can be achieved by effecting storage and delivery of Lewis basic or Lewis acidic gases in reactive liquids or liquid media containing a reactive compound of opposing Lewis acidity or basicity. These systems are comprised of a container of a reactive liquid medium that reacts with the gas to be stored. These systems have the following attributes:

- an ability to shorten the time required to fill the system;
- an ability to eliminate and reduce liquid entrainment in the delivered gas; and,
- an ability to increase the purity of the gas delivered from the system where the source gas contains impurities, in particular impurities which are non reactive or less reactive than the source gas.

DETAILED DESCRIPTION OF THE INVENTION

It has been found that storage and delivery systems based upon the concept of reacting Lewis basic and Lewis acidic gases in a liquid medium of opposite acidity or basicity present unique problems when compared to those low pressure storage and delivery systems employing solid absorbents or solid adsorbents. One of the primary problems is that of increasing the rate at which a storage and delivery system containing a reactive liquid medium, e.g., an ionic liquid, can be filled with gas. The term "reactive liquid medium" includes reactive liquids, solutions, dispersions, and suspensions. Another problem is that of increasing the rate of delivery of the gas. Other problems relate to increasing the purity of the gas delivered from the storage and delivery system and, during delivery, preventing liquid from contaminating the gas delivered from the storage and delivery systems.

To facilitate an understanding of the storage and delivery systems, reference is made to the drawings. (Identical numbers have been used in the figures to represent identical parts in the system apparatus.)

Figure 1:
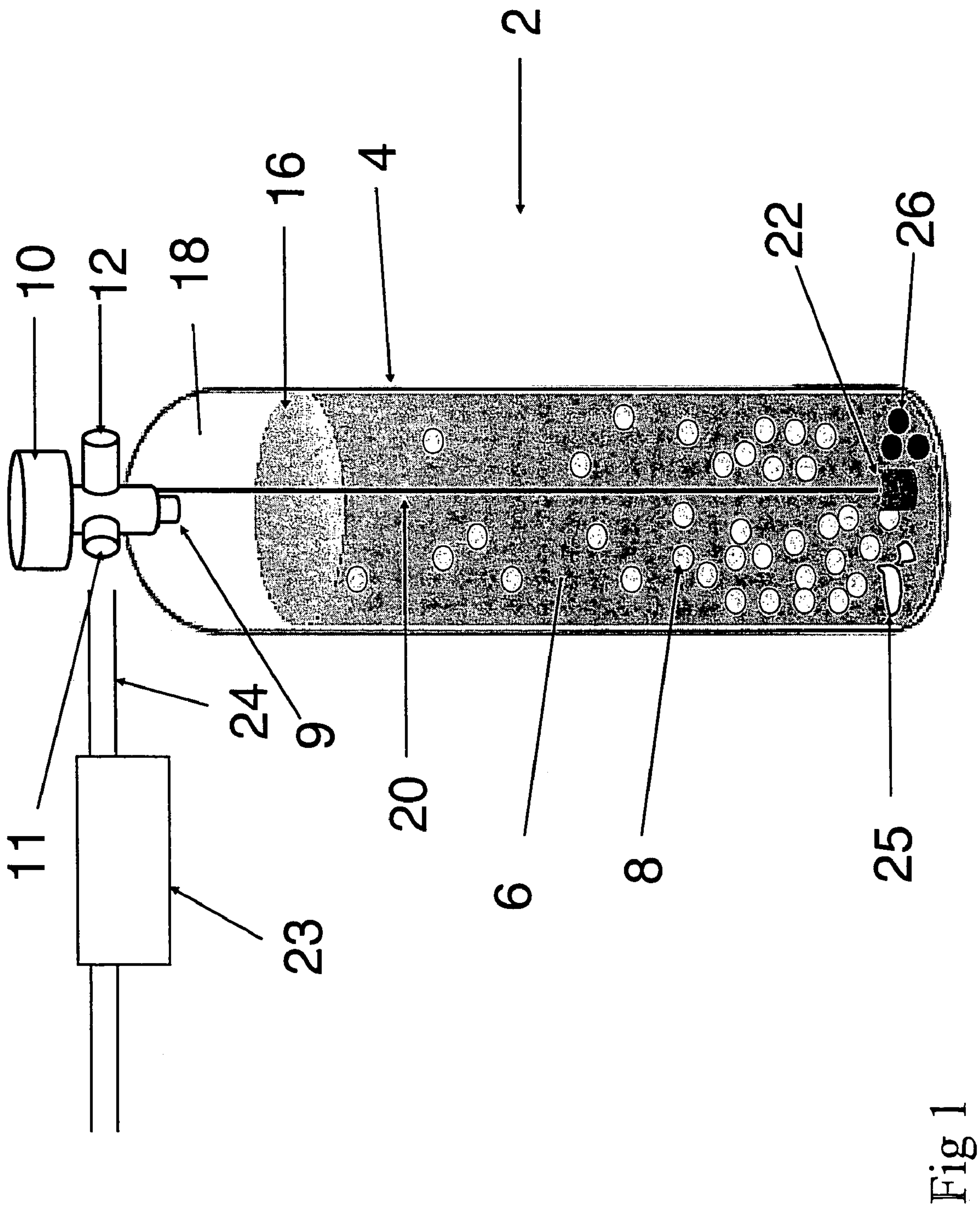
FIG. 1 is a view in cross-section showing a storage and delivery system carrying a liquid capable of reacting with a gas employing a sparger tube for imparting energy to the storage and delivery system.

FIG. 1 shows a gas storage and delivery system 2 comprised of a container 4 containing a Lewis basic or Lewis acidic reactive liquid medium 6 that reversibly reacts with a gas 8 (shown as bubbles) having opposing Lewis acidity or basicity to that of the reactive liquid medium. Container 4 is equipped with valve 10 which allows for the introduction of gas and liquid to the vessel or delivery of gas or removal of reactive liquid medium 6. Outlet port 12 is used to deliver the gas 8 from container 4. A product gas purifier 9 is fitted above the liquid level 16 to prevent liquid from being exhausted with the gas from the headspace 18 through outlet port 12 and/or to remove gas phase impurities from the gas. Product gas purifier 9 can be an adsorbent based gas purifier. Preferably, product gas purifier 9 is a gas/liquid separator. Product gas purifier 9 can be comprised of a membrane and a suitable membrane assembly. In some cases, product gas purifier 9 may be positioned outside of the container. Container 4 may be a cylinder typically used for compressed gases. Alternatively, container 4 can be of other shapes, including a rectangular parallelepiped.

As mentioned one of the problems in filling the storage and delivery system with a reactive gas is in the lengthy time required to fill container 4. It can be limited by the mass transfer (i.e., diffusion) rate of gas 8 within the reactive liquid medium 6. Because this mass transfer process can be slow, several days or even weeks may be required to fill the container. To overcome mass transfer limitations, energy is either added to and/or removed from the liquid during the gas filling process. By effecting an energy transfer, one increases the mass transfer rate via a convective motion within the liquid and/or by increasing the gas-liquid interfacial area.

One method for enhancing energy transfer, and therefore fill rate, is described with reference to FIG. 1. In that embodiment, the inlet port 11 of valve 10 is in fluid communication with sparger tube 20. The term "sparger tube" is meant to include any type of tube that can introduce gas below the surface of the reactive liquid medium. Sparger tube 20 may be a rigid tube or a flexible tube. An optional porous frit 22 having small pores of from 0.1 to 500 microns is appended to the outlet end of sparger tube 20. The porous frit can be made of either metal (e.g., stainless steel) or plastic (e.g. polytetrafluoroethylene). Gas, then, is introduced through inlet port 11 of valve 10, then through sparger tube 20 wherein it is dispersed as fine bubbles when passed through porous frit 22. The finely dispersed bubbles of gas can more easily complex with the reactive liquid medium.

To fill container 4 with gas, a source gas purifier 23 may be used. The outlet 24 of the purifier is connected to inlet port 11. Source gas flows into the purifier, out the outlet 24, and into container 4. Purification of the source gas leads to higher purity gas delivered from container 4. Source gas purifier 23 may employ adsorptive purification, absorptive purification, separation based on relative volatility differences, or reactive purification. Source gas purifier 23 is particularly effective when the impurities in the source gas react with or dissolve in the reactive liquid medium. For example, a Lewis acid gas may consist of boron trifluoride ($BF_3$), containing an impurity carbon dioxide ($CO_2$). The purifier may utilize a zeolite that has a higher affinity for $CO_2$ relative to $BF_3$. For example, 5A zeolites or sodium mordenite zeolites may be used. After purification, the $BF_3$ preferably contains less than 1 ppm of $CO_2$ and is charged to container 4.

Container 4 may also include bubble nucleation enhancers 25. The term "bubble nucleation enhancers" is defined as any media which serves to promote nucleation of gas bubbles. Examples of suitable nucleation enhancers include boiling chips or boiling stones, including those consisting of polytetrafluoroethylene (PTFE), microporous carbon, alumina, perforated glass, and porous metals and plastics. The porous frit 22 may also serve as a nucleation enhancer. These nucleation enhancers increase the rate of gas delivery from the container.

It is also possible to effect removal of impurities within container 4 with purification media 26. This purification media can be positioned within reactive liquid medium 6 to remove impurities. Purification media 26 may consist of a physical adsorbent or a chemisorbent. A chemisorbent may be a solid or it may be dissolved in the liquid medium. Examples of physical adsorbents include zeolites and activated carbon.

Container 4 can operate in either a horizontal or a vertical orientation. The liquid level should be chosen such that product gas purifier 9 is positioned above the surface of the liquid.

Figure 2:
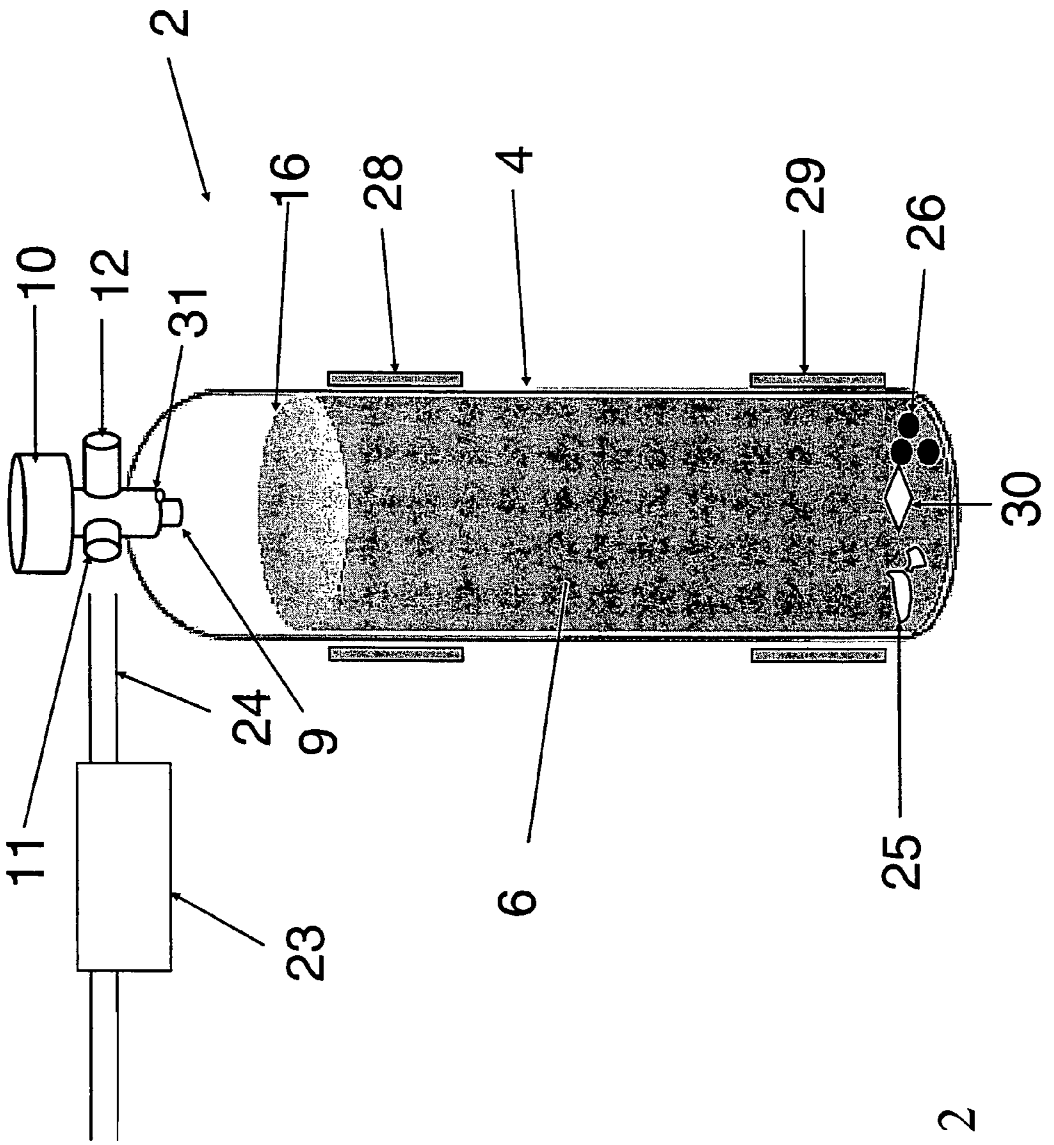
FIG. 2 is a view in cross-section of a storage and delivery system incorporating heating and cooling mandrels for imparting energy to and/or removing energy from the system.

FIG. 2 illustrates a less preferred method for imparting energy into or removing energy from the reactive liquid medium 6. In the embodiment of FIG. 2, a heating mandrel 29 or cooling mandrel 28 or both can be provided to induce convective currents within the reactive liquid medium 6. By heating the bottom of the container 4, the hot liquid flows upward, cools as it reaches the top surface, and then returns to the bottom of the container. This convective motion leads to an increase in mass transfer rate and a decrease in the time required to fill the container with gas. Cooling mandrel 28 can be used in the same manner as heating mandrel 29 to induce convective currents within the reactive liquid medium 6. Heating mandrel 29 can be positioned either around the surface of container 4 (as shown in FIG. 2) or container 4 can rest on heating mandrel 29. Heating mandrel 29 can be a heating blanket, hot plate, or other suitable means to add heat to container 4. Alternatively, one can employ agitation via agitator 30 to enhance the rate of heat transfer within the reactive liquid medium 6 and also enhance the mass transfer rate in the reactive liquid medium during fill. An alternative means to agitate the liquid is to move the entire container 4. This can be accomplished using standard cylinder rollers, orbital stirrers, shakers, and the like. Inlet port 11 does not use the same pathway as product gas purifier 9 or outlet 12, but rather has a separate pathway terminating at inlet orifice 31, so as to bypass the product gas purifier 9 during fill operations.

Figure 3:
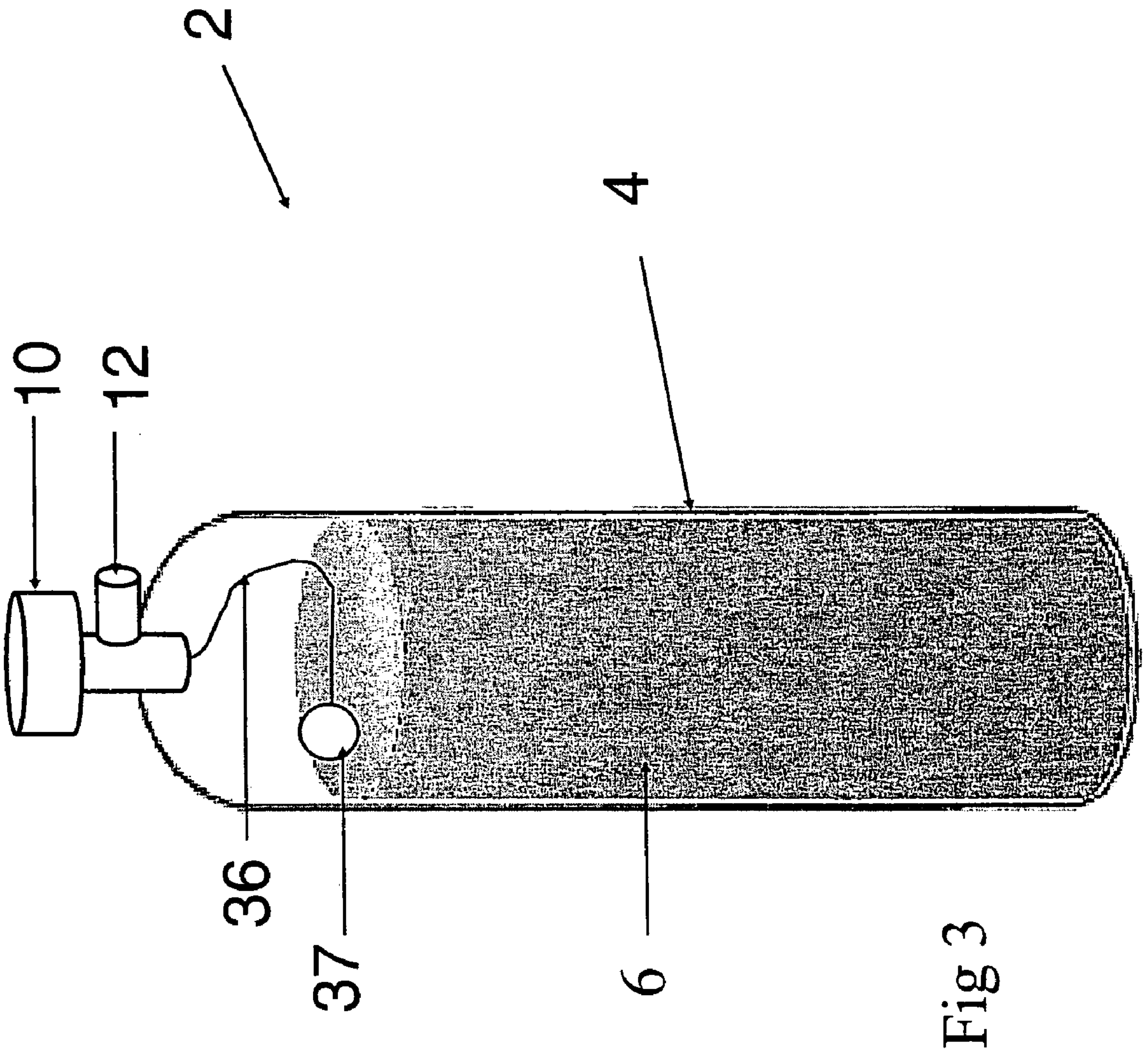
FIG. 3 is a view in cross-section showing a storage and delivery system employing a floating member at the end of a flexible tube to permit gas/liquid separation when the container is operated in either a vertical or horizontal position.
Figure 4:
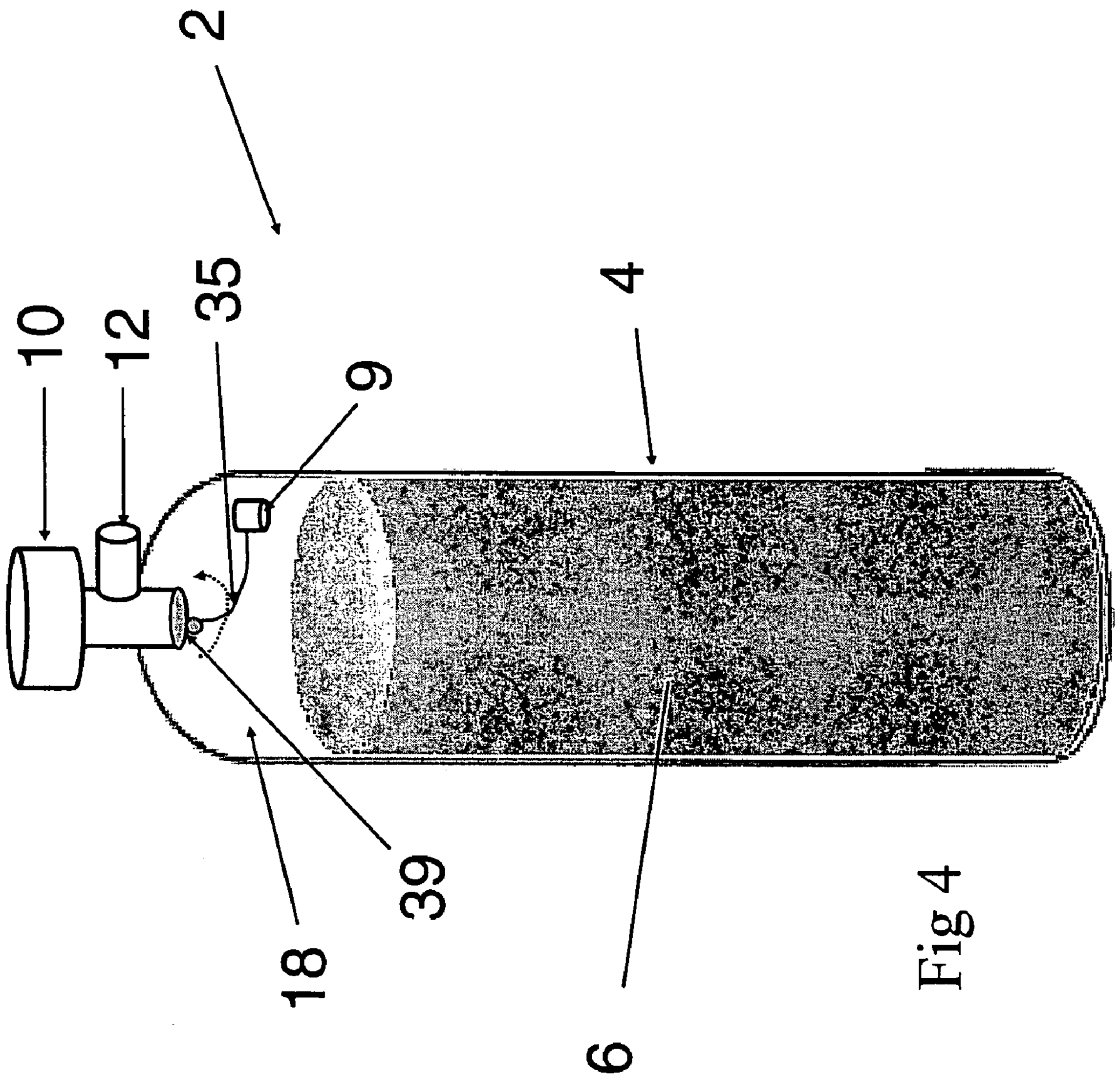
FIG. 4 is a view in cross-section showing a storage and delivery system employing a tortuous flow path so as to permit gas/liquid separation when the container is operated in either a vertical or horizontal position.
Figure 5:
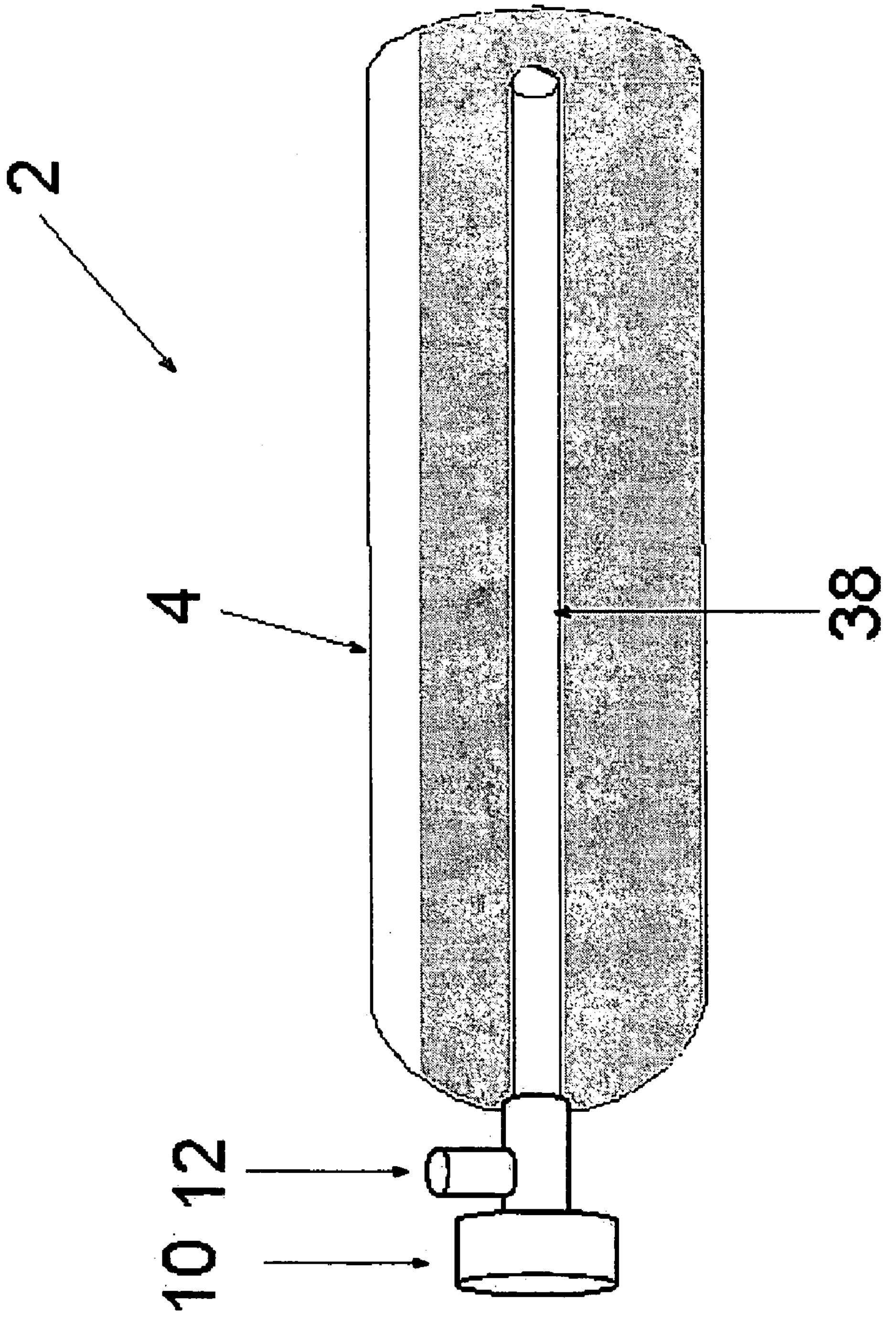
FIG. 5 is a view in cross-section showing a storage and delivery system employing a membrane mounted longitudinally so as to permit gas/liquid separation when the container is operated in either a vertical or horizontal position.

FIGS. 3 through 5 are provided to show various approaches for effecting gas purification during delivery of the gas when the container is in a vertical or horizontal position. In particular, FIGS. 3 through 5 show embodiments wherein the product gas purifier is a gas/liquid separator. In FIG. 3, outlet port 12 of valve 10 is connected to a flexible tube 36 terminating in a porous member 37 acting as the product gas purifier. Porous member 37 preferably is designed to be gas pervious and liquid impervious. In a preferred embodiment it can be of a buoyant material such that when the container is placed in a horizontal position it floats to the top of the liquid layer thus reducing the opportunity for liquid entrainment in the gas.

Also, container 4 can operate horizontally with greater than 50% of the container volume filled with liquid, and preferably with larger amounts of liquid.

In FIG. 4, outlet port 12 is connected to tubing 35. Tubing 35 imparts flow direction changes on the gas delivered from the container. As the gas flows through tubing 35, droplets of liquid are deposited on the surface of the interior wall and are removed from the gas. The tubing shown in FIG. 4 allows the container to operate horizontally with greater than 50% of the container volume filled with liquid. Tubing 35 may impart one or more flow direction changes on the gas as for example a zigzag pattern with multiple flow changes. In addition to tubing 35, other types of tortuous flow devices can be used, including filters, coalescence filters, demister pads, porous media, and sintered media. Tubing 35 may be connected to valve 10 through the use of a rotating fitting 39. The fitting can rotate so that the end of tubing 35 is in fluid communication with the headspace 18 and not in fluid communication with the reactive liquid medium 6. Weights (not shown) can be used to ensure that tubing 35 is in the correct position to provide fluid communication with the headspace 18. Product gas purifier 9 may be added to the end of tubing 35 to prevent liquid from entering tubing 35. Product gas purifier 9 can comprise a membrane. Preferably the membrane is positioned such that any liquid contacting the membrane can readily drain off of the surface of the membrane.

FIG. 5 shows a view of a storage and delivery system 2 in the horizontal position fitted with valve 10 and outlet 12. A membrane 38 is placed horizontally in container 4 and serves as a gas/liquid separator, as a specific embodiment of product gas purifier 9. The membrane is constructed of a gas pervious, liquid impervious material for permitting delivery of gas from container 4. Ideally, the membrane material repels the liquid so that the liquid readily drains off its surface. In addition, to minimize pressure drop, the cross-sectional area of the membrane should be maximized and microporous membranes should be used (as opposed to nonporous membranes). Suitable membrane materials include polytetrafluoroethylene (PTFE), polypropylene (PP), polyvinylidene fluoride (PVDF), polyethylene (PE), polysulfone, poly(vinyl chloride) PVC, rubber, poly(trimethyl pentene), ethylcellulose, poly(vinyl alcohol) (PVOH), perfluorosulfonic acid, polyethersulfone, cellulose ester, polychlorotrifluoro ethylene (PCTFE). Preferred pores sizes are from 0.1 micron to 50 microns. In addition to using thin membranes, the membrane may also consist of thicker porous materials, particularly those with a thickness of up to 10 millimeters. The membranes may also be hollow-fiber type membranes. (These same materials can also be used for product gas purifier 9 in FIG. 1.) Gases suited for storage and delivery from the storage and delivery system 2 described above have Lewis basicity and are delivered from Lewis acidic reactive liquid media, e.g., ionic liquids, or have Lewis acidity and are delivered from Lewis basic reactive liquid media. Lewis basic gases comprise one or more of phosphine, arsine, stibine, ammonia, hydrogen sulfide, hydrogen selenide, hydrogen telluride, isotopically-enriched analogs, basic organic or organometallic compounds, etc. Gases having Lewis acidity to be stored in and delivered from Lewis basic reactive liquid media, e.g., ionic liquids, comprise one or more of diborane, boron trifluoride, boron trichloride, $SiF_4$, germane, hydrogen cyanide, HF, HCl, HI, HBr, $GeF_4$, isotopically-enriched analogs, indium hydride, acidic organic or organometallic compounds, etc. Additional gases such as disilane, digermane, diarsine, and diphosphine may be suitable for storage and delivery in reactive liquid media. The liquid has low volatility and preferably has a vapor pressure below about $10^{-2}$ Torr at 25° C. and, more preferably, below $10^{-4}$ Torr at 25° C.

Ionic liquids can act as a reactive liquid, either as a Lewis acid or Lewis base, for effecting reversible reaction with the gas to be stored. These reactive ionic liquids have a cation component and an anion component. The acidity or basicity of the reactive ionic liquids then is governed by the strength of the cation, the anion, or by the combination of the cation and anion. The most common ionic liquids comprise salts of tetraalkylphosphonium, tetraalkylammonium, N-alkylpyridinium or N,N'-dialkylimidazolium cations. Common cations contain $C_{1-18}$ alkyl groups, and include the ethyl, butyl and hexyl derivatives of N-alkyl-N'-methylimidazolium and N-alkylpyridinium. Other cations include pyridazinium, pyrimidinium, pyrazinium, pyrazolium, triazolium, thiazolium, and oxazolium.

A wide variety of anions can be matched with the cation component of such ionic liquids for achieving Lewis acidity. One type of anion is derived from a metal halide. The halide most often used is chloride although the other halides may also be used. Preferred metals for supplying the anion component, e.g. the metal halide, include copper, aluminum, iron, zinc, tin, antimony, titanium, niobium, tantalum, gallium, and indium. Examples of metal chloride anions are $CuCl_2^-$, $Cu_2Cl_3^-$, $AlCl_4^-$, $Al_2Cl_7^-$, $ZnCl_3^-$, $ZnCl_4^{2-}$, $Zn_2Cl_5^-$, $FeCl_3^-$, $FeCl_4^-$, $Fe_2Cl_7^-$, $TiCl_5^-$, $TiCl_6^{2-}$, $SnCl_5$, $SnCl_6^{2-}$, etc.

Examples of halide compounds from which Lewis acidic or Lewis basic ionic liquids can be prepared include:

- 1-ethyl-3-methylimidazolium bromide; 1-ethyl-3-methylimidazolium chloride; 1-butyl-3-methylimidazolium bromide; 1-butyl-3-methylimidazolium chloride; 1-hexyl-3-methylimidazolium bromide; 1-hexyl-3-methylimidazolium chloride;
- 1-methyl-3-octylimidazolium bromide; 1-methyl-3-octylimidazolium chloride; monomethylamine hydrochloride; trimethylamine hydrochloride; tetraethylammonium chloride; tetramethyl guanidine hydrochloride; N-methylpyridinium chloride; N-butyl-4-methylpyridinium bromide; N-butyl-4-methylpyridinium chloride; tetrabutylphosphonium chloride; and tetrabutylphosphonium bromide.

With reference to Lewis basic ionic liquids, which are useful for chemically complexing Lewis acidic gases, the anion or the cation component or both of such ionic liquids can be Lewis basic. In some cases, both the anion and cation are Lewis basic. Examples of Lewis basic anions include carboxylates, fluorinated carboxylates, sulfonates, fluorinated sulfonates, imides, borates, chloride, etc. Common anion forms include $BF_4^-$, $PF_6^-$, $AsF_6^-$, $SbF_6^-$, $CH_3COO^-$, $CF_3COO^-$, $CF_3SO_3^-$, p-$CH_3$—$C_6H_4SO_3^-$, $(CF_3SO_2)_2N^-$, $(NC)_2N^-$, $(CF_3SO_2)_3C^-$, chloride, and $F(HF)_n^-$. Other anions include organometallic compounds such as alkylaluminates, alkyl- or arylborates, as well as transition metal species. Preferred anions include $BF_4^-$, p-$CH_3$—$C_6H_4SO_3^-$, $CF_3SO_3^-$, $(CF_3SO_2)_2N^-$, $(NC)_2N^-(CF_3SO_2)_3C^-$, $CH_3COO^-$ and $CF_3COO^-$.

Nonvolatile covalent liquids containing Lewis acidic or Lewis basic functional groups are also useful as reactive liquids for chemically complexing gases. Such liquids may be discrete organic or organometallic compounds, oligomers, low molecular weight polymers, branched amorphous polymers, natural and synthetic oils, etc.

Examples of reactive liquids bearing Lewis acid functional groups include substituted boranes, borates, aluminums, or alumoxanes; protic acids such as carboxylic and sulfonic acids, and complexes of metals such as titanium, nickel, copper, etc.

Examples of reactive liquids bearing Lewis basic functional groups include ethers, amines, phosphines, ketones, aldehydes, nitriles, thioethers, alcohols, thiols, amides, esters, ureas, carbamates, etc.

Specific examples of reactive covalent liquids include tributylborane, tributyl borate, triethylaluminum, methanesulfonic acid, trifluoromethanesulfonic acid, titanium tetrachioride, tetraethyleneglycol dimethylether, trialkylphosphine, trialkylphosphine oxide, polytetramethyleneglycol, polyester, polycaprolactone, poly(olefin-alt-carbon monoxide), oligomers, polymers or copolymers of acrylates, methacrylates, or acrylonitrile, etc. Often, though, these liquids suffer from excessive volatility at elevated temperatures and are not suited for thermal-mediated evolution. However, they may be suited for pressure-mediated evolution.

Gases delivered from the storage and delivery system 2 as described previously should be at least as pure as the source gas introduced into the container, and preferably the gas delivered would even be more pure than the source gas. However, as gas is introduced into the container, impurities present in the source gas may become concentrated in the gas headspace above the reactive liquid medium. As a result, the gas initially withdrawn from the container can be less pure than the source gas introduced into the container. To increase the purity of the gas delivery from storage and delivery system 2, source gas can be introduced into the container during the fill process in excess of the desired fill capacity of the container, typically in excess of the reactive capacity of the reactive liquid medium. The desired fill capacity is the amount of gas desired in the container at the end of the fill process. Next, the gas is vented from the container to remove any impurities that have concentrated in the headspace. The remaining gas in the container is used as the product gas for delivery.

In addition, the source gas can be purified before it is introduced into the container. The source gas can be purified using adsorptive purification, absorptive purification, separation based on relative volatility differences, or reactive purification. Purification of the source gas is particularly effective when the impurities in the source gas either react with the reactive liquid medium or dissolve in the reactive liquid medium. For example, in a system used to store and deliver $BF_3$, the source $BF_3$ may contain $CO_2$ as an impurity. This impurity may react with or dissolve in suitable reactive liquid media. To remove the $CO_2$ from the source gas, adsorptive purification can be used. In particular, a bed of zeolite adsorbent and/or activated carbon adsorbent can be positioned upstream of the container of the reactive liquid medium. As the source $BF_3$ flows through the zeolite bed, $CO_2$ impurities are removed. The zeolites can be 5A zeolites or sodium mordenite zeolites.

The invention claimed is:

1. A low pressure storage and delivery system for gases which comprises:

a container having an interior portion containing a reactive Lewis basic or Lewis acidic reactive liquid medium that is reversibly reacted with a gas having opposing Lewis acidity or basicity;

a valve system having an outlet port permitting delivery of gas; and a product gas purifier.

2. The storage and delivery system of claim 1 wherein said product gas purifier is a gas/liquid separator.

3. The storage and delivery system of claim 1 wherein said product gas purifier is positioned within the container.

4. The storage and delivery system of claim 2 wherein said gas/liquid separator is comprised of a membrane.

5. The storage and delivery system of claim 2 wherein the gas/liquid separator is comprised of a member having a tortuous path capable of coalescence of entrained liquid in the gas to be delivered.

6. The storage and delivery system of claim 2 wherein the gas/liquid separator is comprised of a flexible tube that terminates in a buoyant porous member.

7. The storage and delivery system of claim 1 which further comprises bubble nucleation enhancers.

8. The storage and delivery system of claim 1 which further comprises a source gas purifier.

9. The storage and delivery system of claim 1 wherein purification media is present in the reactive liquid medium.

10. The storage and delivery system of claim 9 wherein the purification medium is a chemisorbent.

11. The storage and delivery system of claim 1 wherein the reactive liquid medium is an ionic liquid and the gas complexed with the ionic liquid is selected from the group consisting of stibine, indium hydride, phosphine, boron trifluoride, isotopically enriched boron trifluoride, germane, and arsine.

12. A low pressure storage and delivery system for gases which comprises:

a container having an interior portion containing a reactive Lewis basic or Lewis acidic reactive liquid medium that is reversibly reacted with a gas having opposing Lewis acidity or basicity;

a valve system having an outlet port permitting delivery of gas;

a system for transferring energy into or out of the reactive liquid medium contained in said interior of said container.

13. The storage and delivery system of claim 12 wherein the valve has an inlet port.

14. The storage and delivery system of claim 12 wherein the system for inputting energy into the reactive liquid medium is comprised of a sparger tube.

15. The storage and delivery system of claim 14 wherein the sparger tube incorporates a porous frit.

16. The storage and delivery system of claim 12 wherein the system for inputting energy into the reactive liquid medium is comprised of an agitator for effecting mixing of the liquid.

17. The storage and delivery system of claim 12 wherein the system for transferring energy is comprise of heating and/or cooling mandrels.

18. A low pressure storage and delivery system for gases which comprises:

a container having an interior portion containing a reactive Lewis basic or Lewis acidic reactive liquid medium that is reversibly reacted with a gas having opposing Lewis acidity or basicity;

a valve system having an inlet port for the introduction of gas and reactive liquid medium to the vessel and an outlet port for delivery of gas;

a system for inputting energy into the reactive liquid medium comprised of a sparger tube and, a gas/liquid separator which is pervious to gas and impervious to entrained liquid droplets as gas is delivered from the container.

19. The storage and delivery system of claim 18 wherein the gas/liquid separator is a tube having a tortuous path allowing for coalescence of entrained liquid in the gas to be delivered.

20. The storage and delivery system of claim 18 wherein the gas/liquid separator is a membrane.

21. A process for the delivery of product gas from a storage and delivery system which comprises:

charging a Lewis basic or Lewis acidic reactive liquid medium to a container having an interior portion;

charging the container with a source gas containing a Lewis basic or Lewis acidic reactive gas having opposing Lewis acidity or basicity that reversibly reacts with said reactive liquid medium having Lewis acidity or basicity;

collecting the excess unreacted source gas in a headspace in said container;

venting said excess source gas from the head space in said container to remove impurities that have concentrated in the headspace; and then, delivering a product gas.

22. A process for the delivery of product gas from a storage and delivery system which comprises:

charging a Lewis basic or Lewis acidic reactive liquid medium to a container having an interior portion;

purifying a source gas containing a Lewis basic or Lewis acidic reactive gas having opposing Lewis acidity or basicity that reversibly reacts with said reactive liquid medium having Lewis acidity or basicity to remove impurities present in the source gas;

introducing the purified source gas into a container; and delivering a product gas.

23. The process of claim 22 wherein the reactive gas is boron trifluoride and the impurity is carbon dioxide.

24. The process of claim 23 wherein a zeolite is used to remove carbon dioxide from boron trifluoride.

* * * * *